(12) United States Patent
Li et al.

(10) Patent No.: US 11,507,419 B2
(45) Date of Patent: Nov. 22, 2022

(54) METHOD, ELECTRONIC DEVICE AND COMPUTER PROGRAM PRODUCT FOR SCHEDULING COMPUTER RESOURCES IN A TASK PROCESSING ENVIRONMENT

(71) Applicant: EMC IP Holding Company LLC, Hopkinton, MA (US)

(72) Inventors: Jin Li, Shanghai (CN); Jinpeng Liu, Shanghai (CN); Wuichak Wong, Xiamen (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 282 days.

(21) Appl. No.: 16/845,682

(22) Filed: Apr. 10, 2020

(65) Prior Publication Data
US 2021/0303344 A1   Sep. 30, 2021

(30) Foreign Application Priority Data
Mar. 25, 2020  (CN) .......................... 202010220468.7

(51) Int. Cl.
*G06F 9/48* (2006.01)
*G06F 9/50* (2006.01)

(52) U.S. Cl.
CPC .......... *G06F 9/4881* (2013.01); *G06F 9/5044* (2013.01)

(58) Field of Classification Search
None
See application file for complete search history.

(56) References Cited

U.S. PATENT DOCUMENTS

| 2013/0152097 A1* | 6/2013 | Boctor | G06F 9/505 718/103 |
| 2019/0034227 A1* | 1/2019 | Suman | G06F 9/4881 |
| 2019/0324810 A1 | 10/2019 | Zhao et al. | |

OTHER PUBLICATIONS

Wikipedia, "Intermediate Representation," en.wikipedia.org/w/index.php?title=Intermediate_representation&direction=next&oldid=905361000, Jan. 24, 2020, 4 pages.

Jia et al., "Beyond Data and Model Parallelism for Deep Neural Networks," Proceedings of the 2nd SysML Conference, Palo Alto, CA, Jul. 2018, 13 pages.

(Continued)

*Primary Examiner* — Eric C Wai
(74) *Attorney, Agent, or Firm* — Ryan, Mason & Lewis, LLP

(57) ABSTRACT

A task scheduling method comprises the steps of: in response to the reception of a request for processing a plurality of task sets, creating a current to-be-scheduled task queue in a task processing system based on priorities of the plurality of task sets and tasks in the plurality of task sets, where a plurality of to-be-scheduled tasks in the current to-be-scheduled task queue are scheduled in the same round of scheduling; allocating computing resources used for scheduling the plurality of to-be-scheduled tasks; and enabling the plurality of to-be-scheduled tasks in the current to-be-scheduled task queue to be scheduled by using the computing resources. In this manner, a plurality of tasks with different priorities and quotas can be scheduled according to SLA levels of users, and the efficiency and flexibility of parallel services of cloud computing deep learning models are improved by using a run-time load-balancing scheduling solution.

20 Claims, 6 Drawing Sheets

(56) References Cited

OTHER PUBLICATIONS

Wikipedia, "Deep Learning," en.wikipedia.org/wiki/Deep_learning, Feb. 6, 2020, 33 pages.
Wikipedia, "Everything as a Service," simple.wikipedia.org/wiki/Everything_as_a_service, Aug. 23, 2019, 2 pages.
L. Song et al., "HyPar., Towards Hybrid Parallelism for Deep Learning Accelerator Array," arXiv:1901.02067v1, Jan. 7, 2019, 13 pages.
U.S. Appl. No. 16/540,385 filed in the name of Jinpeng Liu et al. filed Aug. 14, 2019 and entitled "Method, a Device, and a Computer Program Product for Determining a Resource Required for Executing a Code Segment."
U.S. Appl. No. 16/542,757 filed in the name of Jinpeng Liu et al. filed Aug. 16, 2019 and entitled "Method, Device and Computer Program Product for Processing Machine Learning Model."
U.S. Appl. No. 16/678,758 filed in the name of Jinpeng Liu et al. filed Nov. 8, 2019 and entitled "Method, Electronic Device and Computer Program Product for Processing Machine Learning Model."
U.S. Appl. No. 16/789,006 filed in the name of Jin Li et al. filed Feb. 12, 2020, and entitled "Scheduling Artificial Intelligence Model Partitions Based on Reversed Computation Graph."
U.S. Appl. No. 16/823,445 filed in the name of Jinpeng Liu et al. filed Mar. 19, 2020, and entitled "Task Scheduling Method, Electronic Device, and Computer Storage Medium."

\* cited by examiner

METHOD, ELECTRONIC DEVICE AND COMPUTER PROGRAM PRODUCT FOR SCHEDULING COMPUTER RESOURCES IN A TASK PROCESSING ENVIRONMENT

RELATED APPLICATION(S)

The present application claims priority to Chinese Patent Application No. 202010220468.7, filed Mar. 25, 2020, and entitled "Task Processing Method, Electronic Device, and Computer Program Product," which is incorporated by reference herein in its entirety.

FIELD

Embodiments of the present disclosure generally relate to the field of data storage, and in particular, to a task processing method, an electronic device, and a computer program product.

BACKGROUND

In a parallel allocation solution, deep learning (DL) models are scheduled based on resource requirements of tasks from users and available resources of special-purpose processing units. The solution can schedule parallel tasks in a manner of correctly keeping a dependence relationship between tasks, and at the same time can utilize current available resources to the greatest extent.

By means of the foregoing solution, a task set of a single user can be scheduled in parallel. However, to implement DL models in parallel in a cloud computing service as "X-as-a-Service" (XaaS), the allocation of different service-level allocation (SLA) levels to a plurality of users is the most fundamental function. In addition, for computing resources required for tasks from a plurality of users, load balancing of available resources in a task processing system is also a problem worthy of consideration.

SUMMARY

Embodiments of the present disclosure relate to a task processing method, an electronic device, and a computer program product.

In a first aspect of the embodiments of the present disclosure, a task processing method is provided. The method comprises the steps of: in response to the reception of a request for processing a plurality of task sets, creating a current to-be-scheduled task queue in a task processing system based on priorities of the plurality of task sets and tasks in the plurality of task sets, where a plurality of to-be-scheduled tasks in the current to-be-scheduled task queue are scheduled in the same round of scheduling; allocating computing resources used for scheduling the plurality of to-be-scheduled tasks; and enabling the plurality of to-be-scheduled tasks to be scheduled by using the computing resources.

In a second aspect of the embodiments of the present disclosure, an electronic device is provided. The device includes: a processor; and a memory coupled to the processor. The memory stores an instruction that needs to be executed. When executed by the processor, the instruction causes the electronic device to perform actions, the actions comprising the steps of: in response to the reception of a request for processing a plurality of task sets, creating a current to-be-scheduled task queue in a task processing system based on priorities of the plurality of task sets and tasks in the plurality of task sets, where a plurality of to-be-scheduled tasks in the current to-be-scheduled task queue are scheduled in the same round of scheduling; allocating computing resources used for scheduling the plurality of to-be-scheduled tasks; and enabling the plurality of to-be-scheduled tasks to be scheduled by using the computing resources.

In a third aspect of the present disclosure, a computer program product tangibly stored on a non-transitory computer-readable medium and containing machine-executable instructions is provided, wherein when executed, the machine-executable instructions cause a machine to perform steps of a method according to the first aspect.

The summary part is provided to introduce the selection of concepts in a simplified form, which will be further described below in the detailed description. The summary part is intended neither to identify critical features or essential features of the content of the present disclosure nor to limit the scope of the content of the present disclosure.

BRIEF DESCRIPTION OF THE DRAWINGS

In each of the accompanying drawings, like or corresponding numerals represent like or corresponding parts.

DETAILED DESCRIPTION

The example embodiments of the present disclosure are described below in detail with reference to the accompanying drawings. It should be understood that these accompanying drawings and descriptions are only used as example embodiments. It should be noted that according to subsequent descriptions, it is very easy to conceive of alternative embodiments of the structures and methods disclosed herein, and these alternative embodiments may be used without departing from the principle that the present disclosure seeks to protect.

It should be understood that these example embodiments are given only to enable a person skilled in the art to better understand and then implement the present disclosure rather than to limit the scope of the present disclosure in any manner.

As used herein, "include," "comprise," and similar terms used herein should be understood as open terms, i.e., "including/comprising but not limited to." The term "based on" is "at least partially based on." The term "some embodiments" represents "at least some embodiments." The term "another embodiment" represents "at least another embodiment." Related definitions of other terms are given in the following descriptions.

Figure 1:
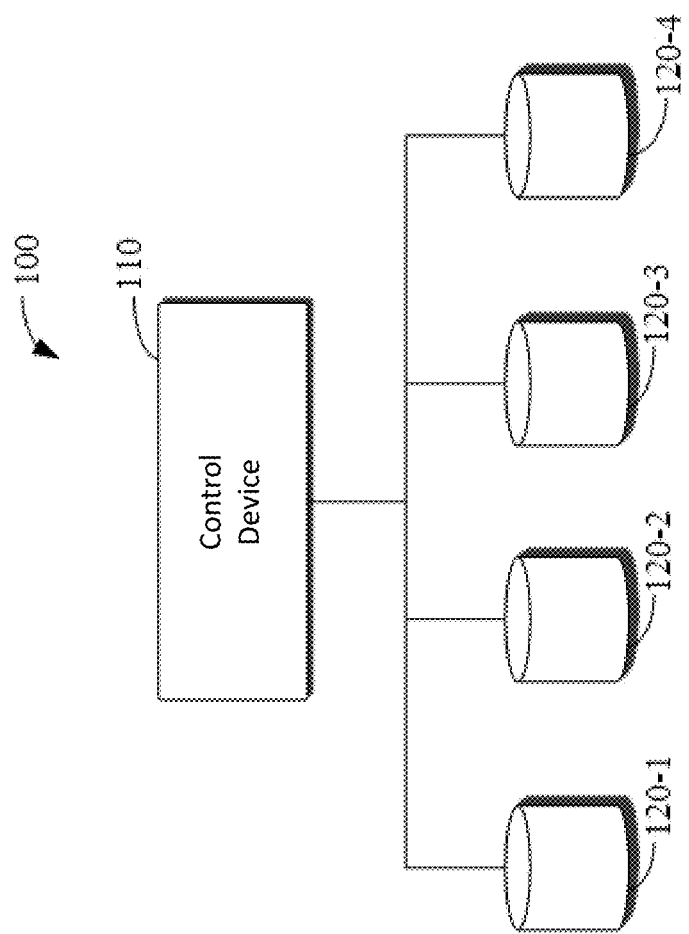
FIG. 1 shows a schematic diagram of an example operating environment in which the embodiments of the present disclosure can be implemented.

FIG. 1 shows a schematic diagram of an example of task processing environment 100 according to an embodiment of the present disclosure. Task processing environment 100 includes control device 110 and special-purpose processing units 120-1 to 120-4. One or more special-purpose processing units 120 may form a task processing system. It should be understood that task processing environment 100 may include any number of special-purpose processing units.

Control device 110 is, for example, but is not limited to, a central processing unit (CPU). Special-purpose processing unit 120 is, for example, but is not limited to, a graphics processing unit (GPU). Control device 110 and one or more special-purpose processing units 120-1 to 120-4 may be located at the same node, for example, a server. Control device 110 may be coupled to special-purpose processing units 120-1 to 120-4 by, for example, a bus.

Control device 110 is configured to determine, from a requested task set, a current to-be-scheduled task queue that requires scheduling and a computing resource requirement for scheduling tasks in the current to-be-scheduled task queue. In addition, control device 110 may further know about current available computing resources that may be used for scheduling tasks, for example, current available resources on special-purpose processing units 120-1 to 120-4 or memory resources and/or thread resources on the GPU.

Computing resources in special-purpose processing units 120-1 to 120-4 may be allocated by control device 110 and used for scheduling and performing tasks in the current to-be-scheduled task queue.

Figure 2:
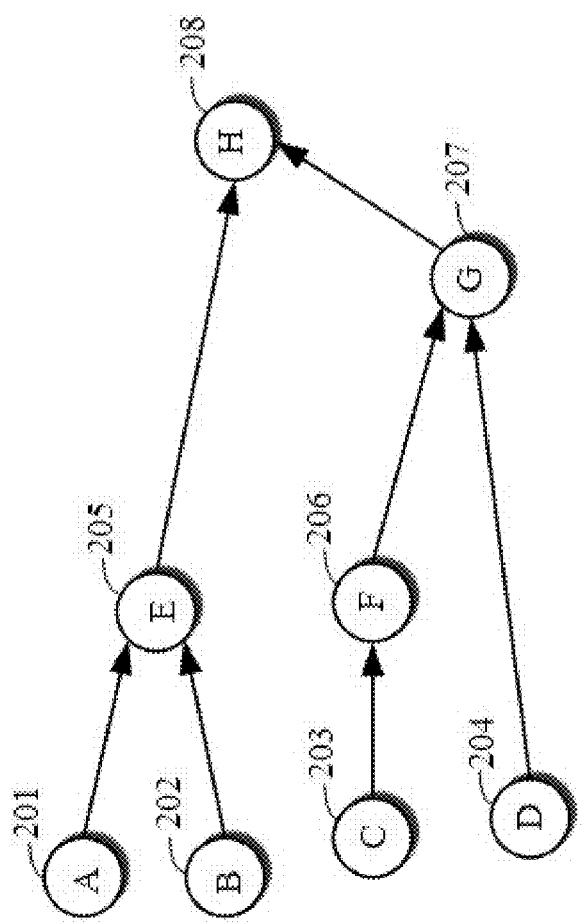
FIG. 2 shows a schematic diagram of parallel execution of a plurality of task sets according to an embodiment of the present disclosure.

As discussed above, in a parallel allocation solution, DL models are scheduled based on resource requirements of tasks from users and available resources of special-purpose processing units. The solution can schedule parallel tasks in a manner of correctly keeping a dependence relationship among a plurality of tasks in the solution. The scheduling of parallel tasks may be implemented by, for example, control device 110 shown in FIG. 1. FIG. 2 shows a schematic diagram of parallel execution of task sets according to an embodiment of the present disclosure. A scheduling process of parallel tasks is described below with reference to FIG. 2.

A plurality of tasks, that is, task A 201, task B 202, task C 203, task D 204, task E 205, task F 206, task G 207, and task H 208 are shown in FIG. 2. The foregoing tasks may be grouped into a first task set [task A 201, task B 202, task C 203, task D 204], a second task set [task E 205, task F 206], a third task set [task G 207], and a fourth task set [task H 208].

Tasks in each task set are independent of each other, and there is a dependence relationship between the task sets. For example, in the second task set [task E 205, task F 206], task E 205 and task F 206 may be performed independently of each other. However, task A 201, task B 202, task C 203, and task D 204 in the first task set all need to be completed before task E 205 and task F 206 can be performed. For the third task set [task G 207], task E 205 and task F 206 in the second task set both need to be completed before the task in the third task set can be performed. Similarly, for the fourth task set [task H 208], task G 207 in the third task set needs to be performed before the task in the fourth task set can be performed.

In the solution described above, task sets of a single user can be scheduled in parallel. However, as discussed above, to implement DL models in parallel in a cloud computing service as "X-as-a-Service" (XaaS), the allocation of different service-level allocation (SLA) levels to a plurality of users is the most fundamental function. In the foregoing solution, the possibility of scheduling task sets of a plurality of users is not considered. Because the scheduling of a plurality of tasks cannot be arranged to support a multi-user scenario, the allocation of computing resources used for scheduling tasks cannot be implemented, making it difficult to implement load balancing.

Therefore, this embodiment of the present disclosure provides a task processing method. In the method, the scheduling of tasks from users can be arranged according to SLA levels allocated to the plurality of users. Meanwhile, desirable load balancing is implemented in the scheduling process.

Figure 3:
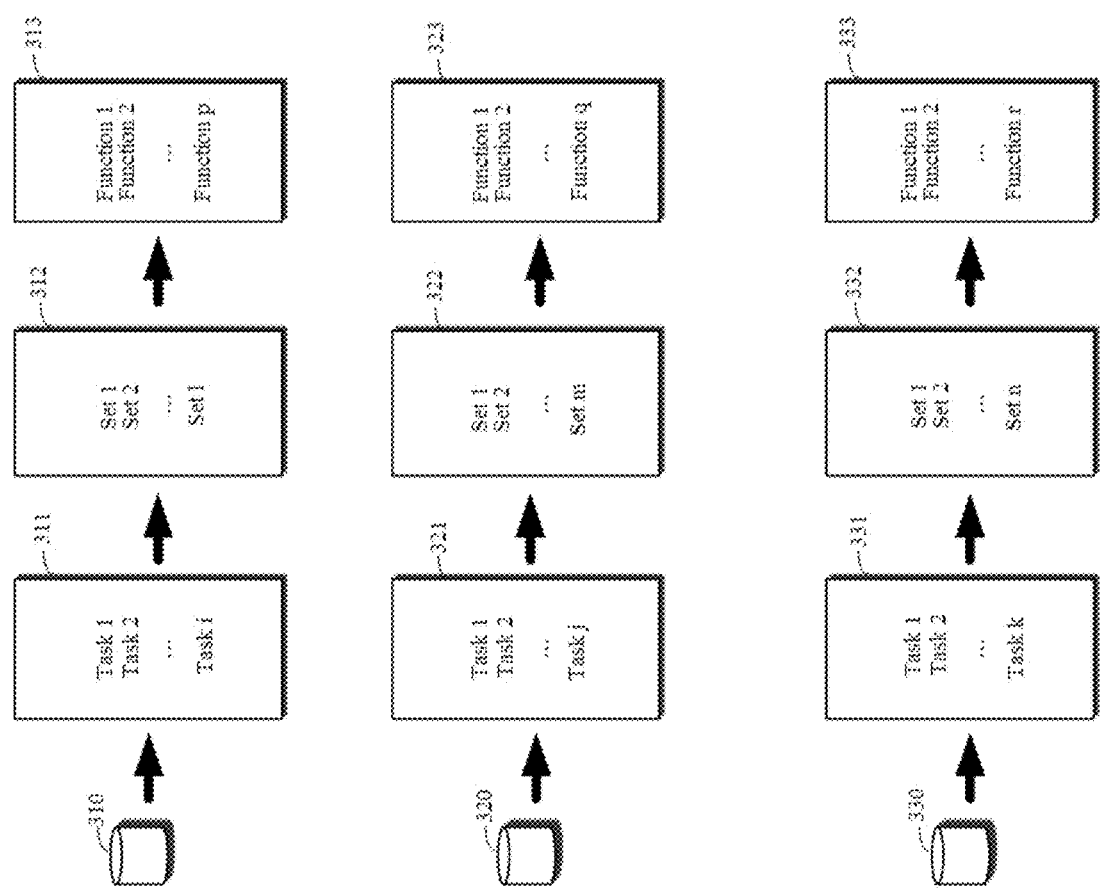
FIG. 3 shows a schematic diagram of parallel execution of a plurality of task sets from a plurality of users according to an embodiment of the present disclosure.

FIG. 3 shows a schematic diagram of parallel execution of a plurality of task sets from a plurality of users according to an embodiment of the present disclosure. The scheduling of task sets according to the embodiments of the present disclosure is further described below in detail with reference to FIG. 3. For ease of description, task processing environment 100 shown in FIG. 1 is still used as an example for description.

Control device 110 in FIG. 1 may receive a processing request for a plurality of task sets of different users. Control device 110 may create a to-be-scheduled task queue "task_queue" according to a plurality of received task sets. During the creation of a to-be-scheduled task queue, control device 110 may consider that different users may have different SLA levels, and a user having a higher SLA level should have a higher task processing priority.

As shown in FIG. 3, for example, control device 110 may receive a processing request for task group 311 from user 310. The task group 311 may include, for example, task 1 to task i. Each of task 1 to task i may further include a plurality of task sets 312. For example, task 1 in task group 311 includes task set 1 to task set 1. For another example, task i in task group 311 may include task set 1 to task set 1. Task set 1 to task set 1 in task group 311 are independent of each other.

To schedule task group 311 or task set 1 to task set 1 in task group 311, computing resources are scheduled in practice to compute function set 313 included therein. For example, the scheduling of task set 1 of task 1 in task group 311 is in practice the scheduling of computing resources used for computing function 1 to function p.

Similarly, FIG. 3 further shows task group 321 from user 320 and task group 331 from user 320 for task group 330.

Task group 321 may include, for example, task 1 to task j. Each of task 1 to task j may further include a plurality of task sets 322. For example, task 1 in task group 321 includes task set 1 to task set m. Task set 1 to task set m in task group 321 are independent of each other.

Task group 331 may include, for example, task 1 to task k. Each of task 1 to task k may further include a plurality of task sets 332. For example, task 1 in task group 331 includes task set 1 to task set n. Task set 1 to task set n in task group 331 are independent of each other.

Similarly, to schedule task group 321 or task set 1 to task set m in task group 321, computing resources are scheduled in practice to compute function set 323 included therein. For example, the scheduling of task set 1 of task 1 in task group 321 is in practice the scheduling of computing resources used for computing function 1 to function q.

To schedule task group 331 or task set 1 to task set n in task group 331, computing resources are scheduled in practice to compute function set 333 included therein. For example, the scheduling task set 1 of task 1 in task group 331 is in practice the scheduling of computing resources used for computing function 1 to function r.

It is assumed that user 310 has the highest SLA level (referred to as SLA1 below), user 320 has an SLA level (referred to as SLA2 below) lower than that of user 310, and user 330 has an SLA level (referred to as SLA 3 below) lower than that of user 320. Control device 110 may create a current to-be-scheduled task queue in task processing environment 100 according to the SLA levels of the users.

It should be understood that, FIG. 3 only shows an example of task groups from users having different SLA levels. Task processing environment 100 may further include a task from another user having a corresponding SLA level.

In some embodiments, control device 110 may determine whether an unscheduled historical task exists in task processing environment 100. The unscheduled historical task may be, for example, a task that fails to be scheduled in a previous round of scheduling. For example, because the task requires a relatively large amount of computing resources, idle computing resources in the previous round of scheduling can satisfy a computing resource requirement of the task, and therefore the task is skipped.

For example, a list "skip_list" used for collecting unscheduled historical tasks exists in task processing environment 100. Before scheduling tasks in a plurality of task sets, control device 110 may examine whether the list of unscheduled historical tasks is empty.

If determining that an unscheduled historical task exists in task processing environment 100, that is, the list of historical tasks is not empty, control device 110 can first schedule a historical task in the list of unscheduled historical tasks before scheduling tasks in the plurality of task sets.

If determining that no unscheduled historical task exists in task processing environment 100, that is, the list of historical tasks is empty, control device 110 may start to schedule tasks in the plurality of task sets.

As discussed above, it is assumed that user 310 has the highest SLA level (referred to as SLA1 below), user 320 has an SLA level (referred to as SLA2 below) lower than that of user 310, and user 330 has an SLA level (referred to as SLA 3 below) lower than that of user 320. Therefore, when creating a to-be-scheduled task list, control device 110 preferentially schedules task set 1 to task set 1 in task group 311.

In some embodiments, control device 110 may first perform a cyclic search for each task in task group 311. During the first time of cyclic search, the control device may add the first function in task set 1 of each task in task group 311 to the to-be-scheduled task list. After the first time of cyclic search, the current to-be-scheduled task list may include, for example, function 1 in task set 1 of task 1 in task group 311, function 1 in task set 1 of task 2 in task group 311, . . . , and function 1 in task set 1 of task i in task group 311.

In the second time of cyclic search, control device 110 may perform a cyclic search for each task in task group 311 again. In addition, in the current time of cyclic search, control device 110 may further perform a cyclic search for each task in task group 321. The control device may add the second function in task set 1 of each task in task group 311 and the first function in task set 1 of each task in task group 321 to the to-be-scheduled task list.

After the second time of cyclic search, for example, function 2 in task set 1 of task 1 in task group 311, function 2 in task set 1 of task 2 in task group 311, . . . , function 2 in task set 1 of task i in task group 311, function 1 in task set 1 of task 1 in task group 321, function 1 in task set 1 of task 2 in task group 321, . . . , and function 1 in task set 1 of task j in task group 321 may be added to the current to-be-scheduled task list.

In some embodiments, control device 110 may further perform the third time of cyclic search. In the current time of cyclic search, control device 110 may perform cyclic search for each task in task group 311 and task group 321 again. In addition, control device 110 may further perform cyclic search for each task in task group 331. The control device may add the third function in task set 1 of each task in task group 311, the second function in task set 1 of each task in task group 321, and the third function in task set 1 of each task in task group 331 to the to-be-scheduled task list.

After the third time of cyclic search, for example, function 3 in task set 1 of task 1 in task group 311, function 3 in task set 1 of task 2 in task group 311, . . . , function 3 in task set 1 of task i in task group 311, function 2 in task set 1 of task 1 in task group 321, function 2 in task set 1 of task 2 in task group 321, . . . , function 2 in task set 1 of task j in task group 321, and function 1 in task set 1 of task 1 in task group 331, function 1 in task set 2 of task 1 in task group 331, . . . , and function 1 in task set 1 of task k in task group 331 may be added to the current to-be-scheduled task list.

Therefore, after the three times of cyclic search, the created to-be-scheduled task list includes function 1 to function 3 retrieved from each first task set of each task in task group 311, function 1 and function 2 retrieved from each first task set of each task in task group 321, and function 1 retrieved from each first task set of each task in task group 331.

The foregoing three times of cyclic search may be considered as one round of scheduling. Tasks (functions) in the to-be-scheduled task list created in this way are scheduled in the same round of scheduling. It may be seen that in the same round of scheduling, a quantity of scheduled tasks in a task set that a user having a relatively high priority requests to execute is greater than a quantity of scheduled tasks in a task set that a user having a relatively high priority requests to execute. In this manner, while it can be ensured that tasks are scheduled in parallel, a scenario in which a plurality of users have different SLA levels is implemented.

It should be understood that the SLA levels above are only used for description, and there may be more or fewer SLA levels through division. Therefore, the number of times of performing cyclic search may also be changed according to the division of SLA levels. That is, one round of scheduling may include more or fewer times of cyclic search.

In some embodiments, after one round of scheduling, control device 110 may further use a label "stop_point" to record a scheduling position where the current round of scheduling stops, so that the position to continue with scheduling can be rapidly found in a next round of scheduling.

In some embodiments, control device 110 does not stop scheduling until every function in every set of all tasks in all task groups are successfully scheduled. In some embodiments, if control device 110 finds that there is no idle computing resource in special-purpose processing unit 120, control device 110 also stops scheduling. In some embodiments, if control device 110 finds that there is no task (function) that can be performed in parallel with a scheduled task (function), control device 110 also stops scheduling.

Figure 4:
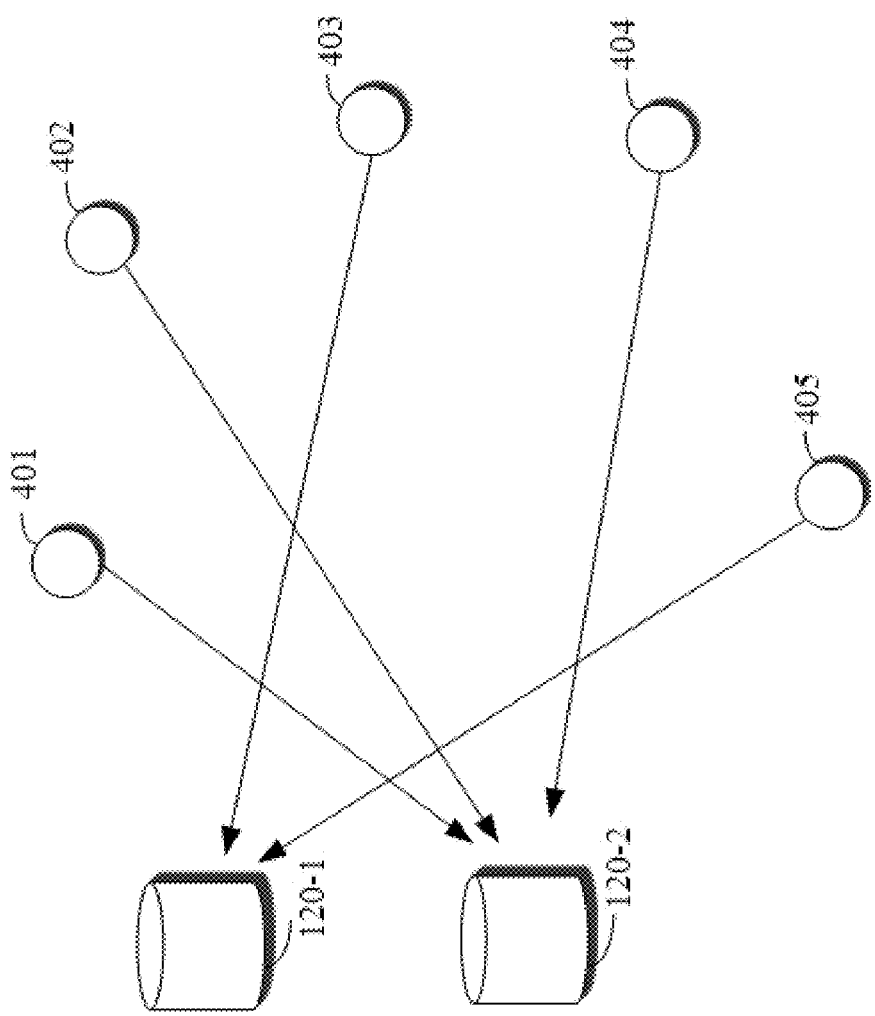
FIG. 4 shows a schematic diagram of balancing the allocation of computing resources according to an embodiment of the present disclosure.

After a to-be-scheduled task list is created, control device 110 may allocate computing resources used for scheduling a to-be-scheduled task in the list and enable the to-be-scheduled task to be scheduled by using the allocated computing resources. FIG. 4 shows a schematic diagram of balancing the allocation of computing resources according to an embodiment of the present disclosure.

A process of allocating computing resources to a to-be-scheduled task is further described below with reference to FIG. 4. For example, special-purpose processing unit 120-1 and special-purpose processing unit 120-2 in FIG. 1 have idle computing resources to be allocated. FIG. 4 shows a scenario of allocating idle computing units of special-purpose processing unit 120-1 and special-purpose processing unit 120-2.

As shown in FIG. 4, the current to-be-scheduled task list may include task 401 to task 405. Control device 110 may determine amounts of computing resources required for task 401 to task 405. Control device 110 may further determine respective amounts of idle computing resources of special-purpose processing unit 120-1 and special-purpose processing unit 120-2. Control device 110 may allocate computing resources according to the determined respective amounts of computing resources required for task 401 to task 405 and the respective amounts of idle computing resources of special-purpose processing unit 120-1 and special-purpose processing unit 120-2.

For example, the amounts of computing resource required for task 401 to task 405 are respectively 10 units, 1 unit, 29 units, 41 units, and 30 units. The remaining amount of idle computing resources of special-purpose processing unit 120-1 is 299 units, and the remaining amount of idle computing resources of special-purpose processing unit 120-2 is 300 units.

Task 401 to task 405 may be sorted according to the respective amounts of computing resources required for task 401 to task 405 to obtain an order: task 404, task 405, task 403, task 401, and task 402. Control device 110 always allocates an amount of idle computing resources of a special-purpose processing unit having the largest amount of idle computing resources to a task that requires the largest amount of computing resources.

For example, an amount of idle computing resources of special-purpose processing unit 120-2 is first allocated to task 404. After allocation, the amount of idle computing resources of special-purpose processing unit 120-2 is 259 units, and the amount of idle computing resources of special-purpose processing unit 120-1 is 299 units. Subsequently, the amount of idle computing resources of special-purpose processing unit 120-1 is allocated to task 405. After allocation, the amount of idle computing resources of special-purpose processing unit 120-2 is 259 units, and the amount of idle computing resources of special-purpose processing unit 120-1 is 269 units.

Next, by analogy, the amount of idle computing resources of special-purpose processing unit 120-1 is allocated to task 403. After allocation, the amount of idle computing resources of special-purpose processing unit 120-2 is 259 units, and the amount of idle computing resources of special-purpose processing unit 120-1 is 240 units. Eventually, the amount of idle computing resources of special-purpose processing unit 120-1 is allocated to task 403 and task 405. The amount of idle computing resources of special-purpose processing unit 120-2 is allocated to task 401, task 402, and task 404.

In this manner, an amount of idle computing resources of a special-purpose processing unit with the largest amount of idle computing resources is always allocated to a task that requires the largest amount of computing resources, so that balanced allocation of idle computing resources can be ensured, thereby implementing load balancing of special-purpose processing units.

In addition, in some embodiments, if determining that none of the special-purpose processing units in environment 100 has an amount of idle computing resources satisfying an amount of computing resources required for a task, control device 110 skips the task. The skipped task cannot be implemented in the round of scheduling. The skipped task may be added to the foregoing list of unscheduled historical tasks "skip_list," so that the task is later scheduled when an amount of idle computing resources of a special-purpose processing unit satisfies the amount of computing resources required for the task.

In this manner, in the embodiments of the present disclosure, a plurality of tasks with different priorities and quotas can be scheduled according to SLA levels of users, and the efficiency and flexibility of parallel services of cloud computing deep learning (DL) models are improved by using a run-time load-balancing scheduling solution.

Figure 5:
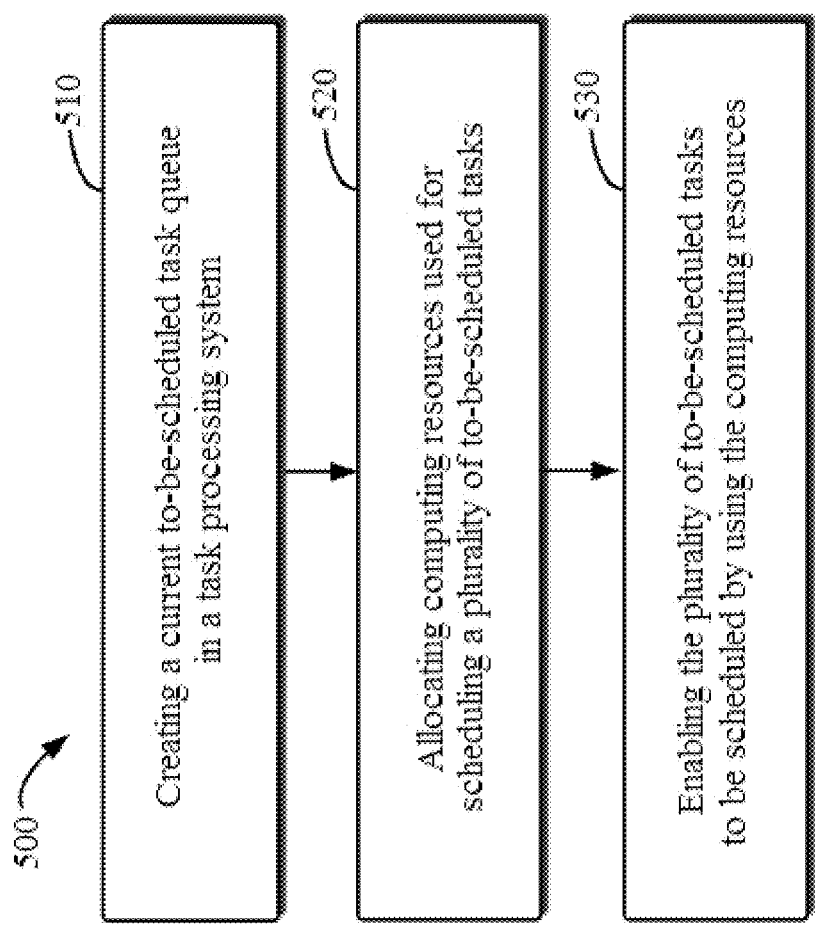
FIG. 5 shows a flowchart of a task processing method according to an embodiment of the present disclosure.

FIG. 5 shows a flowchart of task processing method 500 according to some embodiments of the present disclosure. Method 500 may be implemented at control device 110 shown in FIG. 1. Method 500 may be performed by, for example, any component in operating environment 100 shown in FIG. 1 or may be performed by another special-purpose processing unit in operating environment 100 in FIG. 1.

In block 510, if control device 110 receives a request for processing a plurality of task sets, control device 110 creates a current to-be-scheduled task queue in a task processing system based on priorities of the plurality of task sets and tasks in the plurality of task sets, where a plurality of to-be-scheduled tasks in the current to-be-scheduled task queue are scheduled in the same round of scheduling.

In some embodiments, control device 110 determines whether an unscheduled historical task exists in the task processing system and creates the current to-be-scheduled task queue according to a determination that no to-be-scheduled historical task exists.

In some embodiments, control device 110 schedules, according to a determination that a to-be-scheduled historical task exists, the historical task before the task in the plurality of task sets is scheduled.

In some embodiments, control device 110 determines service levels corresponding to users associated with the plurality of task sets and determines the priorities of the plurality of task sets based on the service levels.

In block 520, control device 110 allocates computing resources used for scheduling the plurality of to-be-scheduled tasks.

In some embodiments, the plurality of task sets at least include a first task set and a second task set, the first task set has a first priority, the second task set has a second priority, and the first priority is higher than the second priority. Control device 110 may determine a first quantity of tasks in the first task set and a second quantity of tasks in the second task set and create the current to-be-scheduled task queue based on the first priority, the second priority, the first quantity, and the second quantity, to enable a third quantity of tasks in the first task set in the current to-be-scheduled task queue to exceed a fourth quantity of tasks in the second task set.

In block 530, control device 110 enables the plurality of to-be-scheduled tasks to be scheduled by using the computing resources.

In some embodiments, the task processing system includes a plurality of special-purpose processing units. Control device 110 may determine amounts of computing resources required for the plurality of to-be-scheduled tasks and amounts of idle computing resources of the plurality of special-purpose processing units. Control device 110 may allocate the computing resources based on the amounts of idle computing resources and the amounts of computing resources required for the plurality of to-be-scheduled tasks.

In some embodiments, the plurality of special-purpose processing units at least includes a first special-purpose processing unit and a second special-purpose processing unit. Control device 110 may compare a first amount of idle computing resources of the first special-purpose processing unit with a second amount of idle computing resources of the second device and determine a first to-be-scheduled task from the plurality of to-be-scheduled tasks according to a determination that the first amount of idle computing resources exceeds the second amount of idle computing resources. An amount of computing resources required for the first to-be-scheduled task exceeds a resource amount threshold. Control device 110 may allocate, from the first amount of idle computing resources, an amount of computing resources used for scheduling the first to-be-scheduled task.

In some embodiments, control device 110 may determine whether the amount of idle computing resources satisfies an amount of computing resources required for a first to-be-scheduled task in the plurality of to-be-scheduled tasks. Control device 110 adds the first to-be-scheduled task to a to-be-scheduled task queue in a next round according to a determination that the amount of idle computing resources does not satisfy the amount of computing resources required for the first to-be-scheduled task.

Figure 6:
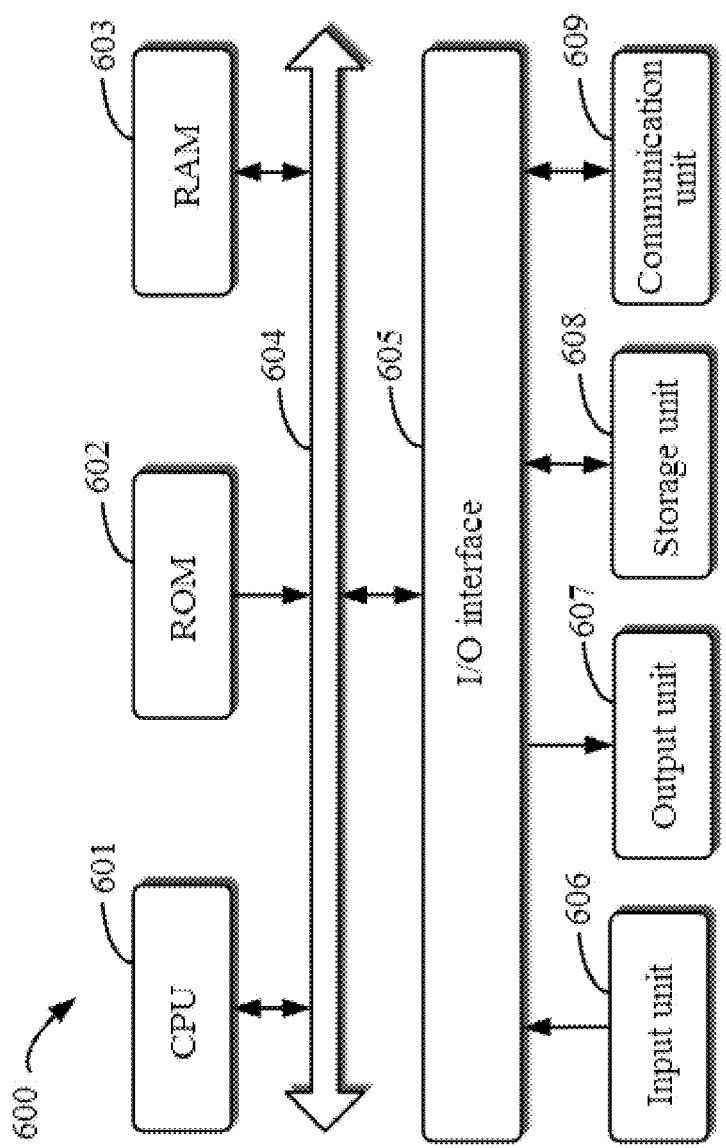
FIG. 6 shows a block diagram of an example device for implementing the embodiments of the present disclosure.

FIG. 6 is a schematic block diagram of an example device 600 that may be used to implement an embodiment in the content of the present disclosure. For example, control device 110 shown in FIG. 1 may be implemented by device 600. As shown in the figure, device 600 includes central processing unit (CPU) 601 that may perform various appropriate actions and processing according to computer program instructions stored in read-only memory (ROM) 602 or computer program instructions loaded from storage unit 608 into random access memory (RAM) 603. RAM 603 may further store various programs and data required for the operation of unit 600. CPU 601, ROM 602, and RAM 603 are connected to each other via bus 604. Input/output (I/O) interface 605 is also connected to bus 604.

A plurality of parts in device 600 are connected to I/O interface 605 and include: input unit 606, for example, a keyboard or a mouse; output unit 607, for example, various types of displays and loudspeakers; storage unit 608, for example, a magnetic disk or an optical disc; and communication unit 609, for example, a network interface card, a modem, or a wireless communication transceiver. Communication unit 609 allows device 600 to exchange information/data with other devices via a computer network such as the Internet and/or various types of telecommunication networks.

Various processes and processing described above, e.g., method 500, can be performed by processing unit 601. For example, in some embodiments, method 500 can be implemented as a computer software program that is tangibly contained in a machine-readable medium, e.g., storage unit 608. In some embodiments, a computer program can be partially or completely loaded to and/or installed on device 600 via ROM 602 and/or communication unit 609. When the computer program is loaded to RAM 603 and executed by CPU 601, one or more actions of the above described method 500 may be implemented.

The present disclosure may be a method, an apparatus, a system, and/or a computer program product. The computer program product may include a computer-readable storage medium on which computer-readable program instructions for implementing various aspects of the present disclosure are loaded.

The computer-readable storage medium can be a tangible device that can retain and store instructions for use by an instruction execution device. For example, the computer-readable storage medium may be, but is not limited to, an electric storage unit, a magnetic storage unit, an optical storage unit, an electromagnetic storage unit, a semiconductor storage unit, or any suitable combination of the foregoing. More specific examples (a non-exhaustive list) of the computer-readable storage medium include: a portable computer physical disk, a physical hard disk, a random access memory (RAM), a read-only memory (ROM), an erasable programmable read-only memory (EPROM or flash memory), a static random access memory (SRAM), a portable compact physical disk read-only memory (CD-ROM), a digital versatile physical disk (DVD), a memory stick, a physical floppy disk, a mechanical encoding device, such as a punch card or a protruding structure within a groove on which instructions are stored, and any suitable combination of the above. The computer-readable storage medium, as used herein, is not to be construed as being transient signals per se, such as radio waves or other freely propagating electromagnetic waves, electromagnetic waves propagating through a waveguide or other transmission media (for example, light pulses propagating through a fiber-optic cable), or electrical signals transmitted through an electrical wire.

The computer-readable program instructions described herein can be downloaded to various computing/processing devices from a computer-readable storage medium, or downloaded to an external computer or an external storage device via a network, e.g., the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within various computing/processing devices.

The computer program instructions for performing the operations of the present disclosure may be assembly instructions, instruction set architecture (ISA) instructions, machine instructions, machine-related instructions, microcode, firmware instructions, status setting data, or source code or object code written in any combination of one or more programming languages. The programming languages include object-oriented programming languages (such as Smalltalk, C++, etc.) and conventional procedural programming languages (such as the "C" language or similar programming languages). The computer-readable program instructions may be executed entirely on a user computer, partly on a user computer, as a stand-alone software package, partly on a user computer and partly on a remote computer, or entirely on a remote computer or server. In cases involving a remote computer, the remote computer may be connected to a user computer via any type of network, including a local area network (LAN) or a wide area network (WAN), or may be connected to an external computer (for example, via the Internet using an Internet Service Provider). In some embodiments, an electronic circuit, for example, a programmable logic circuit, a field programmable gate array (FPGA), or a programmable logic array (PLA), is customized by utilizing state information of the computer-readable program instructions. The electronic circuit may execute the computer-readable program instructions to implement various aspects of the present disclosure.

Various aspects of the present disclosure are described herein with reference to flowcharts and/or block diagrams of the methods, apparatuses (systems), and computer program products according to the embodiments of the present disclosure. It should be understood that each block of the flowcharts and/or block diagrams and combinations of various blocks in the flowcharts and/or block diagrams can be implemented by the computer-readable program instructions.

These computer-readable program instructions may be provided to a processing unit of a general purpose computer, a special purpose computer, or other programmable data processing apparatuses to produce a machine, such that these instructions, when executed by the processing unit of the computer or other programmable data processing apparatuses, produce an apparatus for implementing the functions/actions specified in one or more blocks of the flowcharts and/or block diagrams. These computer-readable program instructions may also be stored in a computer-readable storage medium, and these instructions cause a computer, a programmable data processing apparatus, and/or other devices to work in a specific manner. Therefore, the computer-readable medium having instructions stored thereon includes an article of manufacture that comprises instructions for implementing various aspects of the functions/actions specified in one or more blocks of the flowcharts and/or block diagrams.

The computer-readable program instructions may also be loaded onto a computer, other programmable data processing apparatuses, or other devices, such that a series of operation steps are performed on the computer, other programmable data processing apparatuses, or other devices to produce a computer-implemented process. Therefore, the instructions executed on the computer, other programmable data processing apparatuses, or other devices implement the functions/actions specified in one or more blocks of the flowcharts and/or block diagrams.

The flowcharts and block diagrams in the accompanying drawings illustrate the architectures, functions, and operations of possible implementations of the systems, methods, and computer program products according to a plurality of embodiments of the present disclosure. In this regard, each block in the flowcharts or block diagrams may represent a module, a program segment, or a part of instructions, which contains one or more executable instructions for implementing specified logical functions. In some alternative implementations, the functions noted in the blocks may also occur out of the order noted in the accompanying drawings. For example, two blocks shown in succession may, in fact, be executed substantially concurrently, or the blocks may sometimes also be executed in the reverse order, depending upon the functionality involved. It should also be noted that each block in the block diagrams and/or flowcharts and combinations of blocks in the block diagrams and/or flowcharts can be implemented with a dedicated hardware-based system that performs the specified functions or actions, or with a combination of dedicated hardware and computer instructions.

Although various embodiments of the present disclosure have been described above, the above description is exemplary and not exhaustive, and is not limited to various embodiments disclosed. Many modifications and variations will be apparent to a person of ordinary skill in the art without departing from the scope and spirit of various embodiments described. The terms used herein are chosen to best explain the principles, practical applications, or technical improvements to technologies in the market of various embodiments, and otherwise to enable another person of ordinary skill in the art to understand various embodiments disclosed herein.

What is claimed is:

1. A task scheduling method, comprising the steps of:
   in response to the reception of a request for processing a plurality of task sets, creating a current to-be-scheduled task queue in a task processing system based on priorities of the plurality of task sets and tasks in the plurality of task sets, wherein the plurality of task sets comprises a first task set having a first priority and a second task set having a second priority, the first priority being greater than the second priority, wherein a plurality of to-be-scheduled tasks in the current to-be-scheduled task queue are scheduled in the same round of scheduling; and
   allocating computing resources used for scheduling the plurality of to-be-scheduled tasks in the same round of scheduling;
   wherein creating the current to-be-scheduled task queue comprises:
      performing multiple executions of a cyclic search of the first and second task sets;
      identifying respective tasks of the first and second task sets independent of each other; and
      adding the respective tasks of the first and second task sets to the current to-be-scheduled task queue;
   wherein allocating computing resources enables the first and second tasks having respective first and second priorities to be scheduled for execution in the same round of scheduling using the computing resources; and
   wherein the method is performed by at least one processing platform comprising at least one processing device comprising a processor coupled to a memory.

2. The method according to claim 1, wherein creating the current to-be-scheduled task queue comprises the steps of:
   determining whether an unscheduled historical task exists in the task processing system; and
   creating the current to-be-scheduled task queue according to a determination that no to-be-scheduled historical task exists.

3. The method according to claim 2, further comprising the step of:
   scheduling, according to a determination that a to-be-scheduled historical task exists, the historical task before a given task in the plurality of task sets is scheduled.

4. The method according to claim 1, further comprising the steps of:
   determining service levels corresponding to users associated with the plurality of task sets; and
   determining the priorities of the plurality of task sets based on the service levels.

5. The method according to claim 1, wherein creating the current to-be-scheduled task queue further comprises the steps of:
   determining a first quantity of tasks in the first task set and a second quantity of tasks in the second task set; and
   creating the current to-be-scheduled task queue based on the first priority, the second priority, the first quantity, and the second quantity, to enable a third quantity of tasks in the first task set in the current to-be-scheduled task queue to exceed a fourth quantity of tasks in the second task set.

6. The method according to claim 1, wherein the task processing system comprises a plurality of special-purpose processing units, and wherein allocating the computing resources comprises the steps of:
determining amounts of computing resources required for the plurality of to-be-scheduled tasks;
determining amounts of idle computing resources of the plurality of special-purpose processing units; and
allocating the computing resources based on the amounts of idle computing resources and the amounts of computing resources required for the plurality of to-be-scheduled tasks.

7. The method according to claim 6, wherein the plurality of special-purpose processing units at least comprise a first special-purpose processing unit and a second special-purpose processing unit, and wherein allocating the computing resources based on the amounts of idle computing resources and the amounts of computing resources required for the plurality of to-be-scheduled tasks comprises the steps of:
comparing a first amount of idle computing resources of the first special-purpose processing unit with a second amount of idle computing resources of the second special-purpose processing unit;
determining a first to-be-scheduled task from the plurality of to-be-scheduled tasks based on a determination that the first amount of idle computing resources exceeds the second amount of idle computing resources, wherein an amount of computing resources required for the first to-be-scheduled task exceeds a resource amount threshold; and
allocating, from the first amount of idle computing resources, an amount of computing resources used for scheduling the first to-be-scheduled task.

8. The method according to claim 6, further comprising the steps of:
determining whether the amount of idle computing resources satisfies an amount of computing resources required for a first to-be-scheduled task in the plurality of to-be-scheduled tasks; and
adding the first to-be-scheduled task to a to-be-scheduled task queue in a next round according to a determination that the amount of idle computing resources does not satisfy the amount of computing resources required for the first to-be-scheduled task.

9. An electronic device, comprising:
at least one processing unit; and
at least one memory, coupled to the at least one processing unit and storing an instruction configured to be executed by the at least one processing unit, wherein when executed by the at least one processing unit, the instruction causes the device to perform the following steps:
in response to the reception of a request for processing a plurality of task sets, creating a current to-be-scheduled task queue in a task processing system based on priorities of the plurality of task sets and tasks in the plurality of task sets, wherein the plurality of task sets comprises a first task set having a first priority and a second task set having a second priority, the first priority being greater than the second priority, wherein a plurality of to-be-scheduled tasks in the current to-be-scheduled task queue are scheduled in the same round of scheduling; and
allocating computing resources used for scheduling the plurality of to-be-scheduled tasks in the same round of scheduling;
wherein creating the current to-be-scheduled task queue comprises:
performing multiple executions of a cyclic search of the first and second task sets;
identifying respective tasks of the first and second task sets independent of each other; and
adding the respective tasks of the first and second task sets to the current to-be-scheduled task queue;
wherein allocating computing resources enables the first and second tasks having respective first and second priorities to be scheduled for execution in the same round of scheduling using the computing resources.

10. The device according to claim 9, wherein creating the current to-be-scheduled task queue comprises:
determining whether an unscheduled historical task exists in the task processing system; and
creating the current to-be-scheduled task queue according to a determination that no to-be-scheduled historical task exists.

11. The device according to claim 10, further comprising:
scheduling, according to a determination that a to-be-scheduled historical task exists, the historical task before a given task in the plurality of task sets is scheduled.

12. The device according to claim 9, further comprising:
determining service levels corresponding to users associated with the plurality of task sets; and
determining the priorities of the plurality of task sets based on the service levels.

13. The device according to claim 9, further comprising:
determining a first quantity of tasks in the first task set and a second quantity of tasks in the second task set; and
creating the current to-be-scheduled task queue based on the first priority, the second priority, the first quantity, and the second quantity, to enable a third quantity of tasks in the first task set in the current to-be-scheduled task queue to exceed a fourth quantity of tasks in the second task set.

14. The device according to claim 9, wherein the task processing system comprises a plurality of special-purpose processing units, and wherein allocating the computing resources comprises:
determining amounts of computing resources required for the plurality of to-be-scheduled tasks;
determining amounts of idle computing resources of the plurality of special-purpose processing units; and
allocating the computing resources based on the amounts of idle computing resources and the amounts of computing resources required for the plurality of to-be-scheduled tasks.

15. The device according to claim 14, wherein the plurality of special-purpose processing units at least comprise a first special-purpose processing unit and a second special-purpose processing unit, and the computing resources are allocated based on the amounts of idle computing resources and the amounts of computing resources required for the plurality of to-be-scheduled tasks in the following manner:
comparing a first amount of idle computing resources of the first special-purpose processing unit with a second amount of idle computing resources of the second special-purpose processing unit;
determining a first to-be-scheduled task from the plurality of to-be-scheduled tasks based on a determination that the first amount of idle computing resources exceeds the second amount of idle computing resources, wherein an amount of computing resources required for the first to-be-scheduled task exceeds a resource amount threshold; and allocating, from the first amount of idle computing resources, an amount of computing resources used for scheduling the first to-be-scheduled task.

16. The device according to claim 14, further comprising:

determining whether the amount of idle computing resources satisfies an amount of computing resources required for a first to-be-scheduled task in the plurality of to-be-scheduled tasks; and adding the first to-be-scheduled task to a to-be-scheduled task queue in a next round according to a determination that the amount of idle computing resources does not satisfy the amount of computing resources required for the first to-be-scheduled task.

17. A computer-readable storage medium having a computer program stored thereon, wherein the computer program is executed by a machine to implement steps comprising:

in response to the reception of a request for processing a plurality of task sets, creating a current to-be-scheduled task queue in a task processing system based on priorities of the plurality of task sets and tasks in the plurality of task sets, wherein the plurality of task sets comprises a first task set having a first priority and a second task set having a second priority, the first priority being greater than the second priority, wherein a plurality of to-be-scheduled tasks in the current to-be-scheduled task queue are scheduled in the same round of scheduling; and allocating computing resources used for scheduling the plurality of to-be-scheduled tasks in the same round of scheduling;

wherein creating the current to-be-scheduled task queue comprises:

performing multiple executions of a cyclic search of the first and second task sets;

identifying respective tasks of the first and second task sets independent of each other; and adding the respective tasks of the first and second task sets to the current to-be-scheduled task queue;

wherein allocating computing resources enables the first and second tasks having respective first and second priorities to be scheduled for execution in the same round of scheduling using the computing resources.

18. The computer-readable storage medium according to claim 17, wherein creating the current to-be-scheduled task queue comprises the steps of:

determining whether an unscheduled historical task exists in the task processing system; and creating the current to-be-scheduled task queue according to a determination that no to-be-scheduled historical task exists.

19. The computer-readable storage medium according to claim 18, further comprising the step of:

scheduling, according to a determination that a to-be-scheduled historical task exists, the historical task before a given task in the plurality of task sets is scheduled.

20. The computer-readable storage medium according to claim 17, further comprising the steps of:

determining service levels corresponding to users associated with the plurality of task sets; and determining the priorities of the plurality of task sets based on the service levels.

* * * * *